United States Patent [19]
Schaumann

[11] 3,845,829
[45] Nov. 5, 1974

[54] DRILL, ESPECIALLY STONE DRILL

[75] Inventor: Dietrich Schaumann, Weingarten, Germany

[73] Assignee: Hawera Probst KG. Hartmetall Werkzeufabrik Ravensburg, Ravensburg, Germany

[22] Filed: Mar. 12, 1973

[21] Appl. No.: 340,278

[30] Foreign Application Priority Data
Mar. 10, 1972 Germany.......................... 2211532

[52] U.S. Cl. ................................ 175/395, 175/410
[51] Int. Cl. ........................................ E21c 13/08
[58] Field of Search ..................... 175/395, 394, 410

[56] References Cited
UNITED STATES PATENTS

| | | | |
|---|---|---|---|
| 2,101,376 | 12/1937 | Voigtlander | 175/410 |
| 2,529,788 | 11/1950 | Signell | 175/410 X |
| 2,635,856 | 4/1953 | Scheffer | 175/394 |
| 2,673,714 | 3/1954 | Hargrave | 175/394 |
| 3,447,616 | 6/1969 | Granat | 175/394 |
| 3,469,643 | 9/1969 | Horst | 175/394 |
| 3,674,101 | 7/1972 | Chromy | 175/410 X |

*Primary Examiner*—John E. Murtagh
*Assistant Examiner*—Richard E. Favreau
*Attorney, Agent, or Firm*—Walter Becker

[57] ABSTRACT

A stone or masonry drill having a shank with at least one spiral groove commencing at one end and a transverse slot in the one end in which a hard wear resistant blade forming a cutting element is fixed, as by soldering. The blade extends through the web portion of the shank and preferably has the opposite ends disposed at the forwardly facing side of the rib between adjacent convolutions of the groove. The diameter of the one end of the shank falls within the cylindrical envelope of the shank.

2 Claims, 8 Drawing Figures

PATENTED NOV 5 1974

3,845,829

DRILL, ESPECIALLY STONE DRILL

The present invention concerns a drill, especially stone drill, with a drill shank which is provided with at least one drilling spiral and which has one end provided with a drill head forming one single piece with the shank, the drill head being provided with a cutting part of hard metal or the like inserted into a corresponding recess, especially with a cutting plate inserted into a transverse slot. The cutting part forms a cutting tip and cutting edges while the drill head is provided with at least one head groove for the drilling dust, which groove extends up to the cutting part.

With heretofore known drills of this type, the drilling head forms a section which with regard to its outer surface differs from the remaining sections of the drill shank inasmuch the drilling dust spiral ends ahead of the drill head and the latter has separate head grooves for the drilling dust which extend, for instance, in axial direction and which lead to the start of the drilling dust spiral of the drill shank. If the drilled bore is not yet very deep, the transport of the drilling dust usually represents no problem. The drilling dust hammered loose is thrown away from the head through the drilling dust head grooves and is conveyed further away in the latter. With increasing depth of the bore, however, also the degree of filling of the drilling dust head grooves increases so that the drilling dust particles which have been hammered loose will be prevented from being thrown into the spiral groove. The transport of the drilling dust is then effected by a slow movement of the drilling dust from the drilling dust head grooves into the spiral groove. This considerably reduces the drilling output and represents a considerable mechanical load on the drill.

In view of this high mechanical load, with heretofore known drills frequently so-called head breaks occur which, as a rule, start at the bottom of the transverse slot because at this area a considerable weakening of the cross section of the drill is present so that a notch effect is produced. This is due in particular to the fact that the bottom of the slot with the heretofore known drills extends at a right angle to the axis of the drill, and therefore the weakening of the cross section, with regard to the longitudinal direction of the drill, occurs over the entire diameter of the drill in one single axial range. With drills in which the cutting blade is connected by soldering, the hardened drill is within the region of the reduced cross section fully annealed in view of the high soldering temperature of approximately 850°C so that a hardness-transition zone is formed which likewise has the tendency to cause head breaks. Inasmuch as with heretofore known drills, as outlined above, the drill head differs principally as to its geometric shape from the shank of the drill, the drill can after a head break not be used any longer, even when post-machining the same, but is lost in its entirety which fact, particularly with drills of large diameters, represents a considerable loss.

It is, therefore, an object of the present invention to so design a drill of the above described general character that it will have a simple construction and, if necessary, can following a head break by post-machining be restored for use.

This object and other objects and advantages of the invention will appear more clearly from the following specification in connection with the accompanying drawing, in which.

Figure 1:
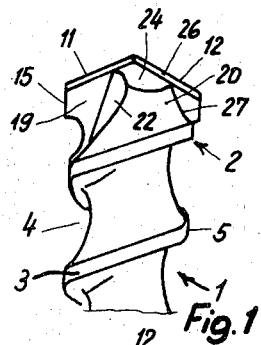
FIG. 1 represents a view of the front side of a drill according to the invention.
Figure 2:
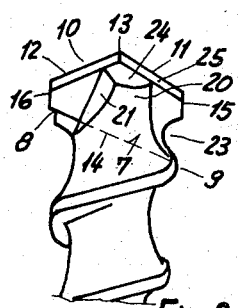
FIG. 2 represents a view of the back side of the drill of FIG. 1.
Figure 3:
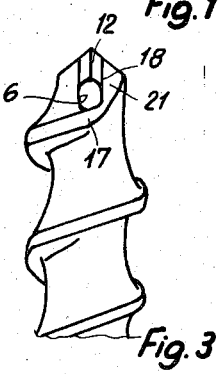
FIG. 3 shows the drill of FIG. 1 as seen from the right-hand side of FIG. 1 with regard to the drawing.
Figure 4:
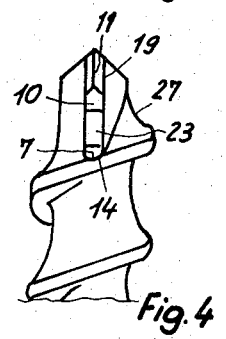
FIG. 4 is a view of the drill of FIG. 1 as seen from the left-hand side of FIG. 1 with regard to the drawing.

The drill according to the present invention is characterized primarily in that the outer surface of the drill head extends at the maximum to the outer surface of the imaginary continuous extension of the drill shank which exclusively by removing material forms the drill head, and the spiral of which extends at least partially approximately to the cutting part and thus with its end also forms the drilling dust head groove. The geometric shape of the drill shank thus continues into the end of the drill head in such a way that the geometric shape of the drill head extends at a maximum to the imaginary continuation of the geometric shape of the drill head so that at any time each desired axial section of the drill shank can by a corresponding machining step be designed as drill head. If the spiral extends at least partially to the cutting part, the drilling dust is immediately after being hammered loose caught by the drilling dust spiral and withdrawn without the necessity that first a substantially only axially directed drilling dust transport is effected. This results in a considerably higher drilling progress than was heretofore possible, and this progress may be higher than heretofore obtainable by 20 percent.

According to a further feature of the invention, that end of the outer edge of the drilling dust spiral which is located at the drill head — as seen in the direction of the drill — is located adjacent the cutting part and extends transverse, especially at a right angle, to the cutting part whereby, in addition to a favorable drilling dust transport, a great strength of the drill head is realized. This feature is further improved when that end of the outer edge of the drill dust spiral which is located at the drill head is arranged on that edge of the cutting part which faces away from the cutting edges and preferably extends to the breast surface of the pertaining edge so that this outer edge is not penetrated by the cutting part. To assure a safe connection of the cutting part, that core portion of the drill shank which protrudes beyond that end of the outer edge of the drill dust spiral which is located at the drill head, extends approximately up to the drill tip whereby a cross section of the drill head is obtained which continuously increases from the drill tip to the outer edge of the drill dust spiral.

For further improving the withdrawal of the drilling dust from the cutting edges into the spiral, the core portion of the drill shank which projects beyond that end of the outer edge of the drill dust spiral which is located at the drill head, forms at the breast surface of the respective cutting edge a drill dust guiding surface which extends transverse to the breast surface and is offset relative to the side edge thereof toward the axis of the drill. This drilling dust guiding surface is located at an incline with regard to the drill axis, preferably in conformity with the pitch of the adjacent section of the drill dust spiral.

For further improving the support of the cutting part, the core portion of the drill shank projects beyond that end of the outer edge of the drill dust spiral which is located at the drill head and extends at the rear surface of the cutting part, which rear surface faces away from the breast surface of the respective cutting edge, approximately up to the axially farthest projecting respective edge and preferably over the entire length thereof.

A favorable guiding of the drill in the bore hole is obtained when the core portion of the drill shank, which projects beyond that end of the outer edge of the drill dust spiral which is located at the dril head, comprises an end surface which forms a continuous extension of the pertaining back surface of the cutting edge and in an angled-off shape merges with the guiding surface.

For obtaining as small a reduction of the drill cross section as possible, the core portion of the drill shank which projects beyond that end of the outer edge of the drill dust sprial which is located at the drill head and/or the depth of the recess extending into the axial direction of the drill is or are less than the pitch of the drill dust spiral. In particular in this instance it is possible that the outer edge of the spiral substantially continuously extends around the recess so that an interruption of this outer edge is completely avoided.

The possibility of inserting the cutting part relatively deeply into the drill head is realized by the fact that the recess in the two side ranges which are located opposite to each other and in which the recess penetrates the outer surface of the drill shank, extends with its bottom surface approximately to the outer edge of the drill dust spiral and preferably is located on that side of this outer edge which faces toward the drill tip.

In order, particularly with the last mentioned design, to assure a free passage of the drill dust also within the region of the drill head, at least one side edge of the cutting part for the drill dust groove, especially that side edge which is located opposite the end of the outer edge of the drill dust spiral which is arranged adjacent the drill head, is provided with a recess which forms preferably at least partially a continuous intermediate section of the drill dust spiral. In addition thereto, or instead thereof, it is also possible that at least one drill dust guiding surface, especially that one which is located opposite that outer edge of the drill dust spiral which is arranged adjacent the drill head, merges with a recess at the pertaining section of the outer edge of the drilling dust spiral which forms a connection between two adjacent windings of the drilling dust spiral so that the drilling dust will be able from the guiding surface to pass directly into the next winding of the drilling dust spiral.

A particularly advantageous further development of the invention consists in that the bottom surface of the recess and/or the pertaining edge of the cutting part, especially with a drill having only one drilling dust spiral, is provided at an incline to the axis of the drill, approximately corresponding to half the pitch of the drilling dust spiral so that the reduction in cross section of the drill head extends over a major axial portion and that due to the thus created gradual transition a considerably higher strength will be realized.

The bottom surface of the recess and/or the pertaining edge of the cutting part may, however, also especially with a drill having two drilling dust spirals, extend approximately at a right angle to the axis of the drill. In order to even more effectively avoid notch effects, the bottom surface of the recess and/or the pertaining edge of the cutting part are rounded in cross section in an interengaging manner while preferably the bottom surface is concavely rounded.

Referring now to the drawing in detail, FIGS. 1 to 4 show a drill according to the present invention which comprises a drill shank 1 having one end thereof provided with a drill head 2. The drill shank 1 is provided with a single drill spiral 3 which forms a drilling dust spiral groove 4 and a spiral-shaped outer edge 5 representing the outer diameter of the drill shank 1 and being located in a cylinder mantle surface. This geometric shape of the drill shank 1 is continued to the end of the drill head 2 which means is continued close to the drill tip. In the drill head 2 there is provided a diametrical slot 6 which is located symmetrically with regard to the axial plane of the drill. The bottom surface 7 of slot 6 extends at an incline to the axis of the drill in conformity with half the pitch of the spiral 3 in such a way that the bottom surface at the areas 8, 9, which are located diametrically opposite to each other and where the bottom surface extends through the outer surface of the drill head 2, is located at that edge of the pertaining section of the outer edge 5 of spiral 3 which is located toward the drill tip. Thus this outer edge 5 is nowhere penetrated or interrupted by the transverse slot 6 but it extends around the slot 6. Inserted into the slot 6 is a cutting blade 10 which has two cutting edges 11, 12 forming an obtuse angle with each other and being located symmetrically with regard to the axis of the drill. The cutting blade 10 forms a cutting tip 13 located on the axis of the drill while the edge 14 of the cutting blade 10 which faces away from the cutting edges 11, 12 is inclined in conformity with the bottom 7 of the slot 6 in such a way that it engages the bottom 7 over its entire surface. The width of the cutting blade 10 is slightly greater than the diameter of the spiral edge 5 so that also the cutting blade 10 with its differently long lateral edges 15, 16 slightly projects beyond the circumference of the drill shank 1.

That end 17 of the outer edge 5 of the drilling dust spiral 3 which is located at the drill head 2 is arranged at that passage 8 of slot 6 which is closer to the drill tip while the pertaining cutting edge 12 extends into this end 17 over the entire width of slot 6 into the plane of the breast surface 18. This surface 18 is formed by one side surface of the cutting blade 10. Within the region of this surface 18, the protruding core portion 20 of the drill head 2 and drill shank 1 forms a guiding surface 21, the core portion 20 receiving the cutting blade 10. The guiding surface 21 extends transverse to the plane of the cutting breast surface 18 and is located at an angle to the axis of the drill in conformity with the pitch of the drilling dust spiral 3. The guiding surface 21 is set back with regard to the axis of the drill relative to the pertaining side edge 16 of the cutting blade 10 and relative to the outer circumference of the outer edge 5. Within the region of the cutting edge breast surface 19 of the other cutting edge 11 there is provided a similar guiding surface 22 which, however, has a greater length and at half a pitch lower than the guiding surface 21 meets the outer edge 5 of the drilling dust spiral 3. That side edge 15 of the cutting blade 10 which pertains to the guiding surface 20 is toward the passage for the drilling dust provided with a recess 23 which may, for instance, be approximately semicircular and which practically forms a continuation or an intermediate section of the spiral groove 4.

The two sections of the end face 24 of the core portion 20 which are located on both sides of the cutting edge 10 respectively form a substantially continuous extension of the back surface 25, 26 of the pertaining cutting edge 11, 12 and respectively in an angled-off manner merge with the pertaining guiding surface 21, 22. These sections 24 of the end face may be located in a common conical surface.

The spiral groove 4 of the drill shank 1 merges in a continuous manner with the drill head 2 where together with its corresponding end section it forms a drilling dust head groove 27 which extends to the cutting blade 10 and to the back side of the cutting blade 10 which faces away from the breast surface 18 of the pertaining cutting edge 12. Drilling dust created by the cutting edge 11 passes through the recess 23 into the groove 27. Drilling dust created by the cutting edge 12 passes through the pertaining guiding surface 21 directly into the groove 27 and the spiral groove 4.

The bottom surface 7 of slot 6 is cross sectionally semicircularly rounded while the pertaining edge 14 of the cutting blade 10 is correspondingly semicircularly rounded.

Figure 5:
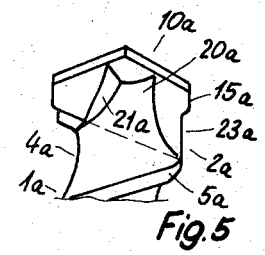
FIGS. 5 and 6 illustrates a further embodiment of a drill according to the invention in views corresponding to those of FIGS. 2 and 4 respectively.
Figure 6:
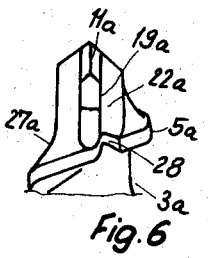

In FIGS. 5 and 6, parts corresponding to those of FIGS. 1–4 have been designated with the same reference numerals but with the additional character a. Similarly, in FIGS. 7 and 8, parts corresponding to thos of FIGS. 1–4 have been designated with the same reference numerals but with the additional character b.

The embodiment illustrated in FIGS. 5 and 6 differs from that of FIGS. 1–4 primarily in that in the corresponding side edge 15a of the cutting blade 10a there is provided only a relatively flat recess 23a, while the pertaining guiding surface 22a merges with a recess 28 in the pertaining section of the outer edge 5a of spiral 3a. Thus, the drilling dust which accumulated at the guiding surface 22a will slide directly into the next winding of the sprial groove 4a and, in contrast to the embodiment of FIGS. 1–4, does not have to be guided past the cutting blade 10a. The recess 28 is formed by a V-shaped cut having one side surface located in the plane of the breast surface 19a of the pertaining cutting edge 11a, whereas the other side surface is located approximately in the plane of the guiding surface 22a.

Figure 7:
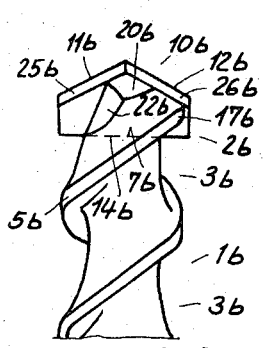
FIGS. 7 and 8 illustrates still another embodiment of the drill according to the invention in views corresponding to those of FIGS. 1 and 3 respectively.
Figure 8:
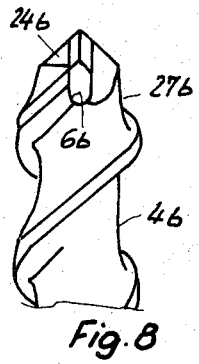

The drill according to FIGS. 7 and 8 has two drilling dust spirals 3b while the bottom 7b of slot 6b is, similar to the pertaining cutting edge 14b of cutting blade 10b, located at a right angle with regard to the axis of the drill. With this embodiment, the two ends 17b of the outer edge 5b of the two spirals 3b extend to the two side surfaces of the cutting blade 10b while each end 17b on that side of the pertaining cutting edge 11b, 12b which faces away from the breast surface is located directly adjacent the cutting blade 10b in the immediate vicinity of the rear surfaces 25b, 26b of the cutting edges 11b, 12b. The core portion 20b thus extends on each side of the cutting blade 10b to that edge of the cutting blade 10b which pertains to the respective cutting edge and extends over the entire length of this edge. As a result thereof, the cutting blade 10b protrudes into the respective spiral groove 4b so that the drilling dust is discharged from the respective pertaining guiding surface approximately at the center of the pertaining spiral groove 4b.

It is, of course, to be understood that the present invention is, by no means, limited to the specific showing in the drawing but also comprises any modifications within the scope of the appended claims.

What is claimed is:

1. A drill, especially a stone or masonry drill, comprising; a rod-like shank having at least one helical groove extending therealong from one end, said shank having a helical rib separating adjacent convolutions of said groove, a transverse slot in said one end of said shank and a hard wear resistant blade in said slot and forming a cutting element, said cutting element having a principal cutting edge on the front facing axially away from said shank and extending transversely to the axis of said shank, said cutting element also having substantially parallel faces and having side edges and having a back edge, the maximum diameter of said shank at said one end falling within the cylindrical envelope of said shank, said spiral groove extending to near said cutting element and that portion thereof adjacent said cutting element forming a passage which receives material taken by said drill, said rib extending to one of the said faces of the cutting insert and being notched adjacent the leading side of the insert, said shank having an inclined surface formed thereon leading from the said notch in said rib to the end of the shank nearest the cutting edge of the insert.

2. A drill according to claim 1 in which the bottom of said slot and the back edge of said cutting insert are inclined relative to the axis of said shank at an angle which is about half the angle of the said helical groove in the shank.

* * * * *